(12) United States Patent
Shen et al.

(10) Patent No.: US 10,623,735 B2
(45) Date of Patent: Apr. 14, 2020

(54) METHOD AND SYSTEM FOR LAYER BASED VIEW OPTIMIZATION ENCODING OF 360-DEGREE VIDEO

(71) Applicant: OrbViu Inc., San Mateo, CA (US)

(72) Inventors: Jiandong Shen, Cupertino, CA (US); Crusoe Xiaodong Mao, Hillsborough, CA (US); Brian Michael Christopher Watson, Groveland, CA (US); Frederick William Umminger, III, Oakland, CA (US)

(73) Assignee: OrbViu Inc., San Mateo, CA (US)

( * ) Notice: Subject to any disclaimer, the term of this patent is extended or adjusted under 35 U.S.C. 154(b) by 197 days.

(21) Appl. No.: 15/873,903

(22) Filed: Jan. 18, 2018

(65) Prior Publication Data

US 2018/0213225 A1    Jul. 26, 2018

Related U.S. Application Data

(60) Provisional application No. 62/448,995, filed on Jan. 21, 2017.

(51) Int. Cl.
| | |
|---|---|
| *H04N 19/114* | (2014.01) |
| *H04N 19/187* | (2014.01) |
| *H04N 19/597* | (2014.01) |
| *H04N 21/2343* | (2011.01) |
| *H04N 21/81* | (2011.01) |
| *H04N 21/218* | (2011.01) |
| *H04N 19/40* | (2014.01) |
| *H04N 19/31* | (2014.01) |

(52) U.S. Cl.
CPC ......... *H04N 19/114* (2014.11); *H04N 19/187* (2014.11); *H04N 19/31* (2014.11); *H04N 19/40* (2014.11); *H04N 19/597* (2014.11); *H04N 21/21805* (2013.01); *H04N 21/234327* (2013.01); *H04N 21/234381* (2013.01); *H04N 21/816* (2013.01)

(58) Field of Classification Search
CPC .... H04N 19/31; H04N 19/187; H04N 19/177; H04N 19/597
See application file for complete search history.

(56) References Cited

U.S. PATENT DOCUMENTS

| | | | |
|---|---|---|---|
| 2016/0269740 A1* | 9/2016 | Choi | ...................... H04N 19/70 |
| 2016/0352791 A1 | 12/2016 | Adams et al. | |
| 2017/0085917 A1 | 3/2017 | Hannuksela | |

(Continued)

*Primary Examiner* — Obafemi O Sosanya
(74) *Attorney, Agent, or Firm* — Kanika Radhakrishnan; Evergreen Valley Law Group

(57) ABSTRACT

A method and system for layer based encoding of a 360 degrees video is provided. The method includes receiving, by a server, an input video. The input video includes multiple groups of pictures (GOPs). Each GOP starts from a major anchor frame of the input video and includes frames till next major anchor frame. The method also includes generating a first layer. The first layer includes one encoded frame per GOP. The method further includes generating a first sub-layer. The first sub-layer includes encoded frames of multiple mini-GOPs and reconstructed frames of encoded frames of the first layer. Each mini-GOP includes frames between two major anchor frames. Furthermore, the method includes outputting encoded video including the first layer and the first sub-layer.

19 Claims, 10 Drawing Sheets

(56) References Cited

U.S. PATENT DOCUMENTS

| | | |
|---|---|---|
| 2017/0123614 A1 | 5/2017 | Perlegos et al. |
| 2017/0223368 A1* | 8/2017 | Abbas .................. H04N 19/146 |
| 2017/0237983 A1 | 8/2017 | Adsumilli et al. |
| 2018/0103199 A1 | 4/2018 | Hendry et al. |

* cited by examiner

METHOD AND SYSTEM FOR LAYER BASED VIEW OPTIMIZATION ENCODING OF 360-DEGREE VIDEO

FIELD OF THE INVENTION

The present disclosure relates to a method and a system for encoding a video and, more particularly, to a method and system for performing a layer based view optimization encoding of 360-degree video for consumption by a virtual reality (VR) device.

BACKGROUND

In a typical video processing scenario, a video is first encoded to reduce consumption of bandwidth during transfer of the video. The encoded video is then streamed and decoded at client end to display the video. Over a period of time, use of 360-degree video has increased and hence, a need for efficient video encoding method has also cropped up. Several methods exist to encode 360-degree video. However, these methods suffer from one or more drawbacks as discussed below.

One existing method includes capturing the 360-degree video and encoding the video using any existing two-dimensional (2D) video encoding methods. However, such method treats all viewing angles equally and results in wastage of resources. For example, bitrate is wasted on scenes that are out of field of view while scene that is in field of view does not have desired quality.

Another existing method includes view optimization encoding method. Human eyes and the viewing devices usually have limited field of view that is much smaller than the 360-degree that the 360-degree video provides. In general, view optimization methods try to encode less information outside the field of view and encode more information within the field of view. Particularly, a pyramid mapping based view optimization method exists. In this method, a view is a selected viewing angle in the 360-degree video. For each selected view, a view port is created from the input 360-degree video using a sphere-to-pyramid geometry mapping. The created view port video has full spherical coverage and full frame rate but only the front view of each view port has full resolution while the side views and the rear view have reduced resolution. In this way, only the video content inside the front view is to be presented with high video quality while the rest of the video content will be presented with lower video quality. The created view port videos are then encoded using traditional video encoding method. A major drawback of the method is that many view ports are needed to produce smooth view switching and this results in redundancy among view ports as each view port is independent from each other. In addition, this also adds to large amount of storage. Further, large number of view ports with large sizes results in increasing view switching latency and in preventing pre-buffering in video streaming due to view change.

Therefore, there is a need for a method and a system for performing a layer based view optimization encoding of 360-degree video for consumption by a virtual reality (VR) device in an efficient manner.

SUMMARY

Various embodiments of the present disclosure provide systems and methods for layer based view optimization encoding of a 360-degree video.

A method for encoding an input video includes receiving, by a server, the input video. The input video includes multiple groups of pictures (GOPs). Each GOP starts from a major anchor frame of the input video and includes frames till next major anchor frame. The method also includes generating a first layer. The first layer includes one encoded frame per GOP. The method further includes generating a first sub-layer. The first sub-layer includes encoded frames of multiple mini-GOPs and reconstructed frames of encoded frames of the first layer. Each mini-GOP includes frames between two major anchor frames. Furthermore, the method includes outputting encoded video including the first layer and the first sub-layer.

A system for encoding an input video includes a first layer encoder for receiving the input video. The input video includes multiple groups of pictures (GOPs). Each GOP starts from a major anchor frame of the input video and includes frames till next major anchor frame. The first layer encoder generates a first layer. The first layer includes one encoded frame per GOP. The system also includes a first sub-layer encoder for generating a first sub-layer. The first sub-layer includes encoded frames of multiple mini-GOPs and reconstructed frames of encoded frames of the first layer. Each mini-GOP includes frames between two major anchor frames. The first sub-layer also outputs the encoded video including the first layer and the first sub-layer.

A method for decoding an encoded video stream (streams) includes receiving, by a client device, the encoded video stream. The encoded video stream includes multiple groups of pictures (GOPs). Each GOP starts from a major anchor frame of the encoded video stream and includes frames till next major anchor frame. The method also includes identifying a first layer from the encoded video stream. The first layer includes one encoded frame per GOP. The method further includes performing 2D video decoding on the first layer to generate decoded frames of the first layer. The method also includes identifying a first sub-layer from the encoded video stream. The first sub-layer includes encoded frames of multiple mini-GOPs and reconstructed frames of encoded frames of the first layer. Each mini-GOP includes frames between two major anchor frames. The method further includes performing 2D video decoding on the first sub-layer to generate decoded frames of the first sub-layer. Furthermore, the method includes performing post processing on decoded frames of the first layer and the first sub-layer to generate view for display.

A system for decoding an encoded video stream (streams) includes a first layer decoder for receiving the encoded video stream. The encoded video stream includes multiple groups of pictures (GOPs). Each GOP starts from a major anchor frame of the encoded video stream and comprising frames till next major anchor frame. The first layer decoder also identifies a first layer. The first layer includes one encoded frame per GOP. The first layer further decodes frames of the first layer to generate decoded frames of the first layer. The system also includes a first sub-layer decoder for identifying a first sub-layer. The first sub-layer includes encoded frames of multiple mini-GOPs and reconstructed frames of encoded frames of the first layer. Each mini-GOP includes frames between two major anchor frames. The first sub-layer decodes frames of the first sub-layer to generate decoded frames of the first sub-layer. The system further includes a post processor for post processing frames of the first layer and the first sub-layer to generate view for display.

Other aspects and example embodiments are provided in the drawings and the detailed description that follows.

BRIEF DESCRIPTION OF THE FIGURES

For a more complete understanding of example embodiments of the present technology, reference is now made to the following descriptions taken in connection with the accompanying drawings in which.

Figure 1:
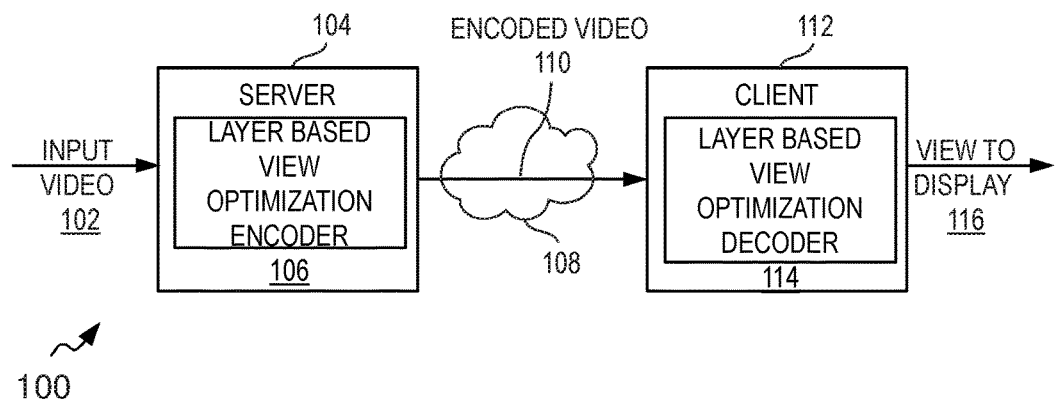
FIG. 1 illustrates an environment, in accordance with an example embodiment of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, apparatuses and methods are shown in block diagram form only in order to avoid obscuring the present disclosure.

Reference in this specification to "one embodiment" or "an example embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Overview

A method and a system for encoding 360-degree video for consumption by a virtual reality (VR) device are provided.

A method for encoding a 360-degree video includes receiving, by a server, an input video. The input video includes multiple groups of pictures (GOPs). Each GOP starts from a major anchor frame (or key frame) of the input video and includes frames till next major anchor frame. The major anchor frame is a head picture and is usually encoded as an I-frame (intra frame) or I-picture. Within each GOP, there are multiple mini GOPs. Each mini GOP includes one sub-major anchor frame and multiple regular frames in between two sub-major anchor frames. The sub-major anchor frames are usually coded as P-frames or P-pictures while the regular frames are usually coded as B-frames or B-pictures or Bref frames or Bref pictures. The distance between the two sub-major anchor frames is called mini-GOP size. The distance between the two major anchor frames is called GOP size.

The input video is received and encoded using a layer based view optimization approach. A first layer (also referred to as the top layer) is generated using the major anchor frames. The video frame in the first layer is obtained from the input video through a temporal sub-sampling, e.g., one video frame per GOP. Number of pictures in the first layer is equal to the number of GOPs. One major anchor frame is taken, by sub-sampling one frame per GOP, from each GOP. The major anchor frames are encoded using 2D encoding techniques to form the first layer. The first layer has no view optimization and is independently encoded from any sub-layers. The encoded major anchor frames are also decoded at the encoder side. The decoded video frame is also known as reconstructed video frame since it is the same input video frame being rebuilt after it is encoded. The reconstructed video frames are used as reference frames for encoding sub-layers. When a video frame is encoded, it becomes bitstream and is referred to herein as encoded bitstream or encoded frame.

The method further includes generating sub-layers or enhanced layers. The sub-layers include all of the video frames that are not included in the first layer. The method also includes encoding the first layer video frames independent of the sub-layers and involves no view optimization. The method further includes encoding the sub-layer video frames with reference to the first layer and with view optimization. Furthermore, the method includes outputting multiple encoded video streams. There is one encoded video stream for the first layer. There could be multiple encoded video streams for the sub-layers, one for each sub-layer for each selected view.

The sub-major anchor frames in a GOP are processed i.e. sub-sampled as per sub-layers need. For example, in one embodiment, the sub-major anchor frames including P-frames and Bref frames of mini GOP are sub-sampled to be included in a first sub-layer (also referred to as a second layer). The frames that are present in the first layer are replaced, in the first sub-layer, with reconstructed frames created during the generation of the first layer. All video frames in the first sub-layer (including the frames replaced with reconstructed frames from first layer) are view optimized using view optimization technique. All the video frames in the first sub-layer are then encoded using 2D encoding techniques to generate the second layer or the first sub-layer. The encoding of the frames replaced with the reconstructed frames from first layer is skipped to avoid wastage of resources. The first sub-layer includes encoded frames that are encoded during generation of the first sub-layer and includes references to the frames encoded in the first layer. The encoded frames included in the first sub-layer are also provided as reconstructed frames for purpose of referencing in further sub-layers.

In an embodiment, a second sub-layer (also referred to as a third layer) is also generated. The second sub-layer includes B frames. The processing of the second sub-layer is similar to the first sub-layer.

The input video is encoded into at least two layers, i.e. the first layer and one or more sub-layer, such as the first sub-layer and the second sub-layer. Each layer generates its own encoded video stream. Multiple layers will generate multiple encoded video streams. The encoded video streams are then sent to a client device. The client device is a VR capable device. The encoded video is decoded to generate a view for display at the client device. The decoding includes decoding the first layer video stream using 2D decoding techniques to generate the decoded first layer. The decoding also includes post processing of the first layer video frames. The post processing includes geometric mapping of the first layer video frames based on the view selected of the sub-layer. The post processed first layer video frames are then used as reference frames during the decoding of the second layer. The post processing also includes decoding remaining frames i.e. frames in the second layer other than the frames present in the first layer, using 2D decoding technique to generate pictures for current view. The pictures decoded from the first layer are regular 360-degree video frames and hence, can be displayed at client device directly. The pictures decoded from the second layer have undergone some geometric mapping and hence, requires a proper reverse geometric mapping to convert the pictures back to regular 360-degree video frames so that they can be displayed at the client device.

Using the cross reference and reuse of portion of previous view port through layered view optimization helps in saving resources. The first layer has the full field of view coverage and can be used as reference for any pictures at the lower layers (also referred to as sub layers). The lower layer has limited field of view and encoding is view optimized to save bitrate. The lower layer picture uses first layer pictures as reference because first layer pictures always have larger field of view than lower layer pictures. The first layer is shared among all the view ports and this helps in removing the redundancy among view port files. Also, the first layer can be pre-buffered without any impact from any view change.

In existing view adaptation solution like pyramid method, the change of a physical view is achieved through switching from one view port file to another view port file. In order for the bitstream to be decodable after the switch, an I-frame is periodically placed within the view port file, i.e. usually one I-frame per GOP, in the existing method. However, in illustrated embodiments of present invention, the pictures in top layer are view independent. When a physical view is changed, only the lower layer pictures are switched from one view port file to another view port file. The top layer pictures stay the same. Because of this characteristic, there is no longer a need to force every picture in top layer to be coded as I-frame. This relaxation allows usage of other coding tools like P-picture to improve the compression efficiency for the top layer pictures.

The high-resolution references, i.e. reconstructed frames from the top layer, allow higher quality reconstruction of side and rear-view angles to improve video quality of these view angles. The sub-layers are view dependent and do not have large I-frame in view port files. The view port file size is smaller and allows the view adaptation files to be pulled in faster. This also helps to reduce the latency with view change.

In one embodiment, the first layer has full spherical view coverage and is view independent without any view optimization. The first layer has one view port of large size and there is no view port change required for any head movement of a user using VR client device. The first sub-layer has middle range of view coverage and has multiple view ports. The view port size is medium, such as 90 degrees field of view. The view port switching happens when head movement is medium or large. The view optimization is performed using any proper view optimization method and the first layer is used as reference for producing full resolution view for the view port. The second sub-layer has smallest range of view coverage, such as 45 degrees field of view and a large number of view ports. The view port size is small with view optimization performed using any proper view optimization method and the first layer and the first sub-layer are used as reference for producing full resolution view for the view port. The view ports are switched quickly as response to small to medium head movement. This allows faster response to head movement by switching view port from the second sub-layer first.

FIG. 1 illustrates an environment 100, in accordance with an example embodiment of the present disclosure.

The environment 100 includes a server 104 that receives an input video 102, hereinafter referred to as the video 102. The video 102 includes multiple groups of pictures (GOPs). Each GOP includes one or more pictures, such as a head picture which is a major anchor frame and usually encoded as an I-frame (intra frame) or I-picture. Within a GOP, there are multiple sub-major anchor frames, usually coded as P-frame or P-picture. One such sub-major anchor frame and the pictures or frames following it forms one mini-GOP. The pictures or frames also include Bref frames and B frames. The distance between the two sub-major anchor frames is called mini-GOP size. The distance between the two major anchor frames is called GOP size. The video can have GOPs with multiple sizes.

The server 104 includes a layer based (view optimization) encoder 106 for encoding the video 102 to generate an encoded video 110. The encoded video 110, including multiple streams, is sent to a client device 112 via a network 108. There is one encoded video stream for the first layer.

There could be multiple encoded video streams for the sub-layers, one for each sub-layer for each selected view. The streamed video is decoded using a layer based (video optimization) decoder 114 followed by further processing to generate a view to display 116.

The server 104 is a video streaming server and has access to several videos via a video database. Examples of the network 108 includes, but are not limited to, internet, intranet, wireless, wired and any other network that supports video streaming Example of the client device 112 includes a mobile phone connected to a VR device, a VR device, a processor connected to a VR device, or any other combination of a processor and device having VR capabilities. The video 102 is typically a 360-degree video but may include any other video that can undergo layer based processing.

Figure 2:
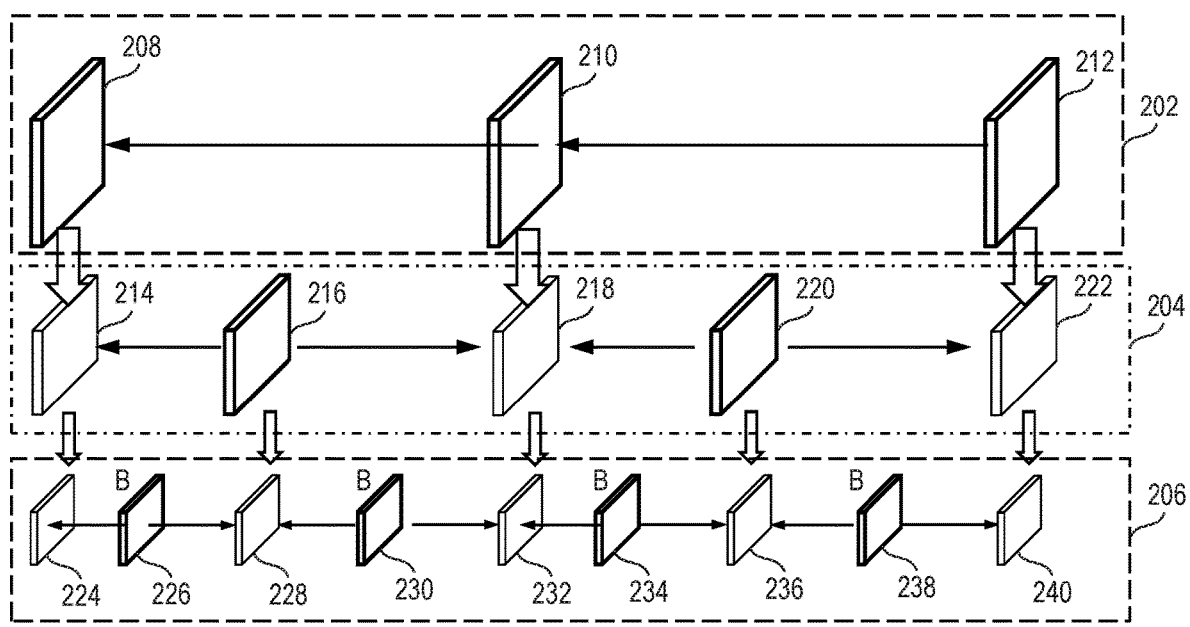
FIG. 2 illustrates layer based architecture of an input video, in accordance with an example embodiment of the present disclosure.

FIG. 2 illustrates layer based architecture of an input video, in accordance with an example embodiment of the present disclosure.

The encoded video 110 includes one top layer video stream 202 (top layer 202) or a first layer video stream 202 (first layer 202), and at least one sub-layer or lower layer stream such as a first sub-layer video stream 204 (first sub-layer 204) or a second layer video stream 204 (second layer 204), and a second sub-layer video stream 206 (second sub-layer 206) or a third layer video stream 206 (third layer 206).

The first layer 202 includes a full spherical view and is view independent. The first layer 202 includes number of pictures equal to number of GOPs in the video 102, i.e. the first layer 202 includes one picture from each GOP. For example, the first layer 202 includes an encoded I-frame 208 from a first GOP, an encoded P-frame 210 from a second GOP, and an encoded P-frame 212 from a third GOP. The frame 208, the frame 210, and the frame 212 are encoded using 2D video techniques.

The second layer 204 or the first sub-layer 204 is a view dependent layer and has a field of view smaller than the first layer 202. For example, in one embodiment, the second layer 204 has 90 degrees field of view. The second layer 204 has at least one picture per mini GOP. The second layer 204 includes a reference or reconstructed I-frame 214 from the first layer 202, an encoded Bref frame 216, a reference or reconstructed I-frame 218 from the first layer 202, an encoded Bref frame 220, and a reference or reconstructed I-frame 222 from the first layer 202. The frame 216 and the frame 220 are from different mini GOPs.

The third layer 206 or the second sub-layer 206 is a view dependent layer and has a field of view smaller than the second layer 204. For example, in one embodiment, the third layer 206 has 45 degrees field of view. The third layer 206 has all remaining pictures in all GOPs. In one embodiment, the third layer 206 includes a reference or reconstructed I-frame 224 from the second layer 204, an encoded B frame 226, a reference or reconstructed Bref frame 228 from the second layer 204, an encoded B frame 230, a reference or reconstructed I-frame 232 from the second layer 204, an encoded B frame 234, a reference or reconstructed Bref frame 236 from the second layer 204, an encoded B frame 238, and a reference or reconstructed I-frame 240 from the second layer 204. In another embodiment, the reference(s) can be from the first layer 202.

Figure 3:
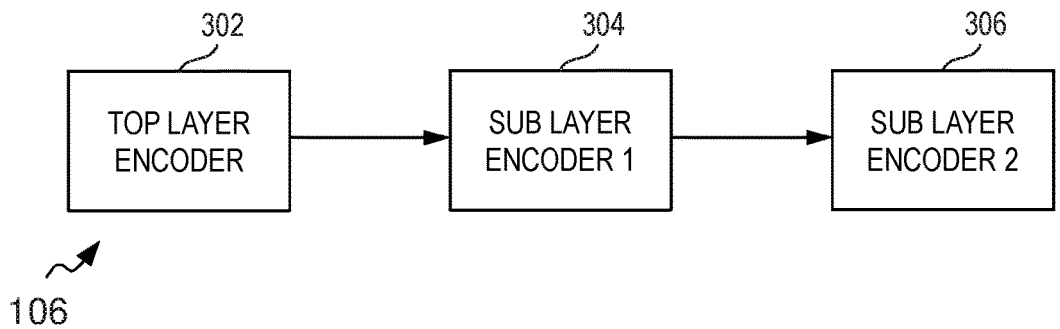
FIG. 3 illustrates a layer based encoder, in accordance with an example embodiment of the present disclosure.

FIG. 3 illustrates a layer based (view optimization) encoder 106, in accordance with an example embodiment of the present disclosure. The layer based encoder 106 includes a top layer encoder 302 (interchangeably referred to as 'first layer encoder 302') for generating the first layer 202, a first sub-layer or a second layer encoder 304 for generating the first sub-layer 204, and a second sub-layer or a third layer encoder 306 for generating the second sub-layer 206.

Figure 4:
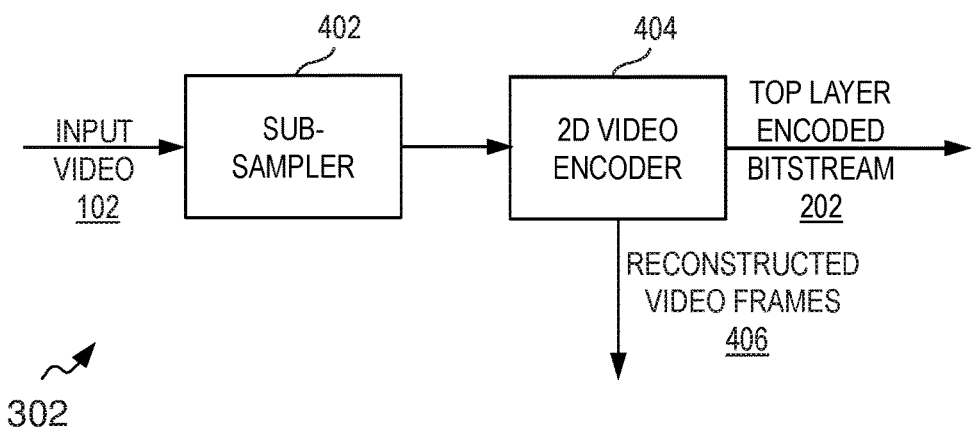
FIG. 4 illustrates a first layer or a top layer encoder, in accordance with an example embodiment of the present disclosure.

FIG. 4 illustrates a first layer or a top layer encoder 302, in accordance with an example embodiment of the present disclosure.

The first layer encoder 302 includes a sub-sampler 402 that receives the video 102, generates one frame per GOP, and sub-samples the major anchor frames. In one embodiment, the sub-sampler 402 is a temporal sub-sampler or frame rate convertor. The sub-sampler 402 samples one frame out of the video sequence at a fixed frame rate, for example one frame per GOP or one frame per second. The frames are then encoded using a 2D video encoder 404 to generate top layer encoded bitstream 202 (also referred to as 'the first layer 202'). The first layer encoder 302 also includes a producer (not shown) that generates the reconstructed frames from the first layer, and a provider (not shown) that provides the reconstructed frames to sub-layers as reference. Reconstructed video frames 406 are also generated for use in referencing by the sub-layers.

Figure 5:
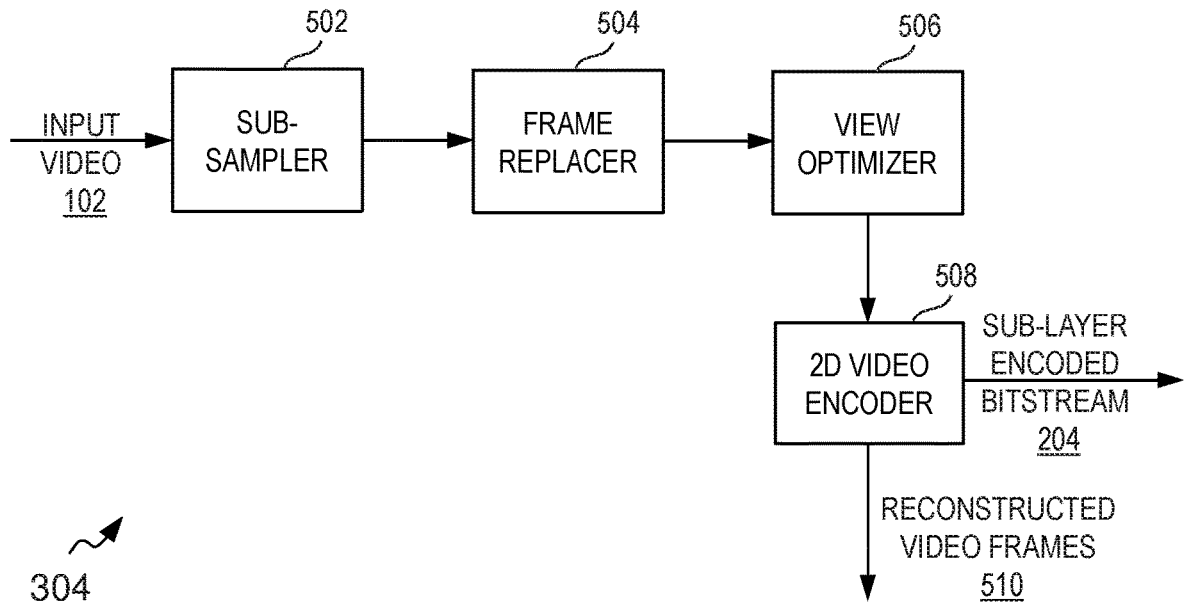
FIG. 5 illustrates a sub-layer encoder, in accordance with an example embodiment of the present disclosure.

FIG. 5 illustrates a sub-layer encoder 304 or 306, in accordance with an example embodiment of the present disclosure.

Each sub-layer encoder, for example a first sub-layer encoder and a second sub-layer encoder, includes a sub-sampler 502 that receives the video 102 and obtains sub-major anchor frames of each mini-GOP within a GOP except for the major anchor frame, and a frame replacer 504 (replacer 504) that replaces the frames in the sub-layer with reconstructed frames of higher layers or top layers and that replaces, in one embodiment, missing major anchor frames in first sub-layer with the reconstructed frames from the first layer. All the frames including the replaced frames are view optimized using a view optimizer 506. The view optimizer 506 performs view optimization, in one embodiment, on the first sub-layer for a selected view. The view optimized frames are then encoded using a 2D video encoder 508 to generate sub-layer encoded bitstream 204 (also the second layer 204). The 2D video encoder 508 encodes, in one embodiment, the first sub-layer except for the major anchor frame which has been encoded already in the first layer. The sub-layer encoder, for example a first sub-layer encoder also include a producer (not shown) that generates the reconstructed frames from the first sub-layer, and a provider (not shown) that provides the reconstructed frames from the first sub-layer to second sub-layer as reference, if needed.

The second sub-layer encoder generates a second sub-layer. The second sub-layer includes remaining frames that are not encoded in the first layer and the first sub-layer. The second sub-layer encoder can have same system elements as the first sub-layer encoder or can have different system elements based on need. For example, a provider may be absent in second sub-layer encoder if not needed.

Reconstructed video frames 510 are also generated for use in referencing during processing of other sub-layers.

In various embodiments, although multiple sub-samplers are shown, the processing of various layers can be done using one sub-sampler or several instances of same or different sub-samplers. Similarly, the 2D encoders and view optimizers may vary or may be the same.

In some embodiments, mere reference of the reconstructed frames from the higher layers is enough and the reconstructed frames from the higher layers need not to be encoded again.

Figure 6:
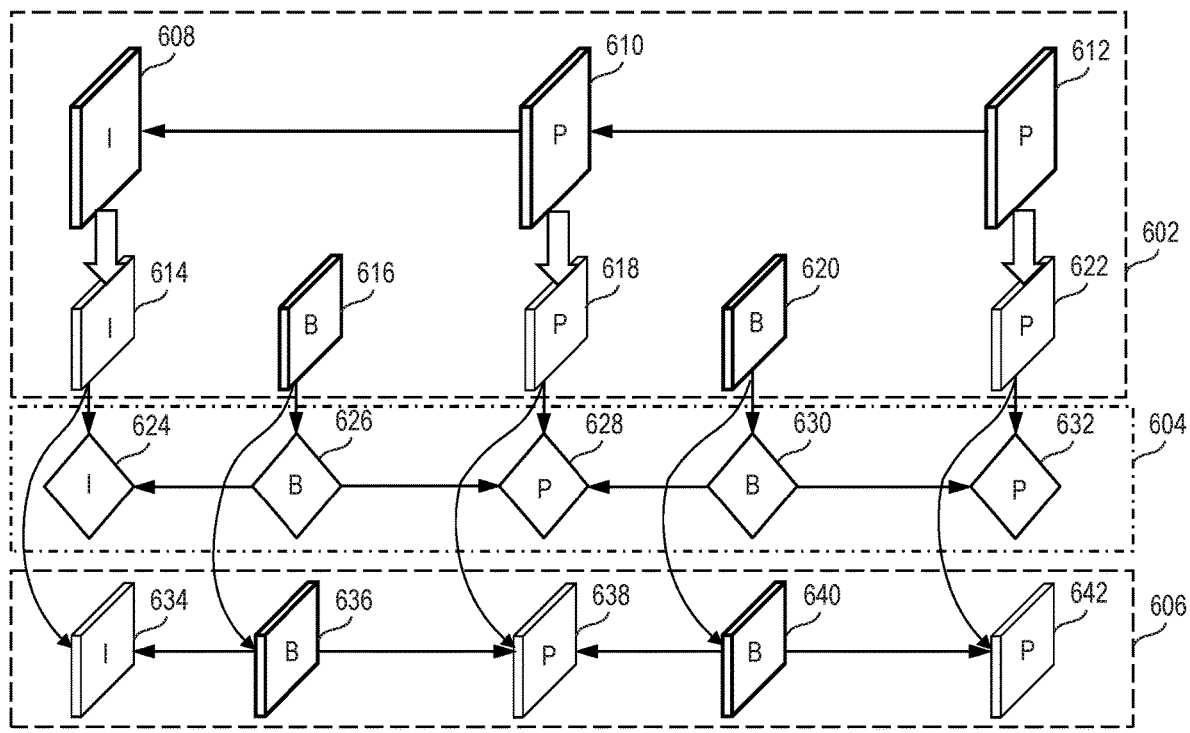
FIG. 6 illustrates a process flow for two layers two views encoding of the input video, in accordance with an example embodiment of the present disclosure.

FIG. 6 illustrates a process flow for two layers two views encoding of the input video 102, in accordance with an example embodiment of the present disclosure.

The video 102 is received, sub-sampled and 2D encoded to generate a first layer 602. The video 102 is in 2D equirectangular format, i.e. width to height ratio is 2:1. The first layer includes one frame per GOP, i.e. an I-frame 608 from a first GOP, a P-frame 610 from a second GOP, and a P-frame 612 from a third GOP. Reconstructed frames 614, 618, and 622 are also generated as an output of generation of the first layer 602. Reconstructed frame 614 is a reference or reconstructed version of the frame 608. Reconstructed frame 618 is a reference or reconstructed version of the frame 610. Reconstructed frame 622 is a reference or reconstructed version of the frame 612.

In illustrated embodiment, the encoding includes encoding frames for at least two views, i.e. view 1 and view 2. The first sub-layer 604 is generated for view-1 and the first sub-layer 606 is generated for view-2. The sub-layers are generated using techniques described herein. The first sub-layer 604 includes a view optimized frame 624 which is generated by view optimizing of reconstructed frame 614. The first sub-layer 604 also includes view optimized B frame 626 which is generated from a B frame 616. Similarly, view optimized frames 628 and 632 are generated from reconstructed frames 618 and 622. Also, view optimized B frame 630 is generated from a B frame 620. For the sub-layer 606, similarly, view optimized frames 634, 638 and 642 are generated from reconstructed frames 614, 618 and 622, respectively, and view optimized B frames 636 and 640 are generated from B frames 616 and 620.

Figure 7:
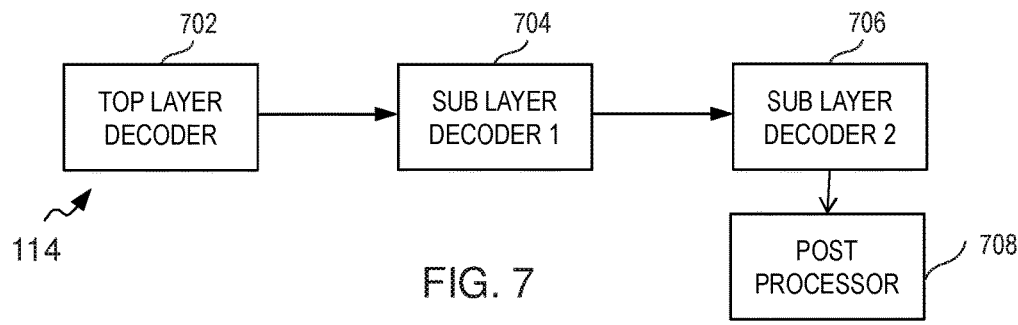
FIG. 7 illustrates a layer based decoder, in accordance with an example embodiment of the present disclosure.

FIG. 7 illustrates a layer based (view optimization) decoder 114, in accordance with an example embodiment of the present disclosure.

The layer based (view optimization) decoder 114 includes a top layer or a first layer decoder 702 for decoding the first layer 202, a first sub-layer or a second layer decoder 704 for decoding the first sub-layer 204, and a second sub-layer or a third layer decoder 706 for decoding the second sub-layer 206. The layer based decoder 114 also includes a post processor 708 for post processing decoded frames of the first layer 202, of the first sub-layer 204, and of the second sub-layer 206 to generate regular 360-degree video frame for display.

Figure 8:
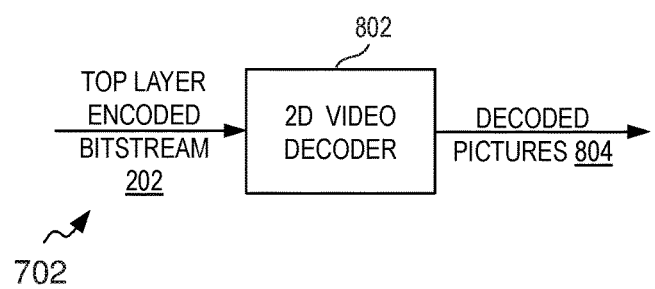
FIG. 8 illustrates a first layer or a top layer decoder, in accordance with an example embodiment of the present disclosure.

FIG. 8 illustrates a first layer or a top layer decoder 702, in accordance with an example embodiment of the present disclosure.

The first layer decoder 702 includes a 2D decoder 802 (2D video decoder 802) for decoding the first layer 202 (or 602) to generate decoded pictures 804.

Figure 9:
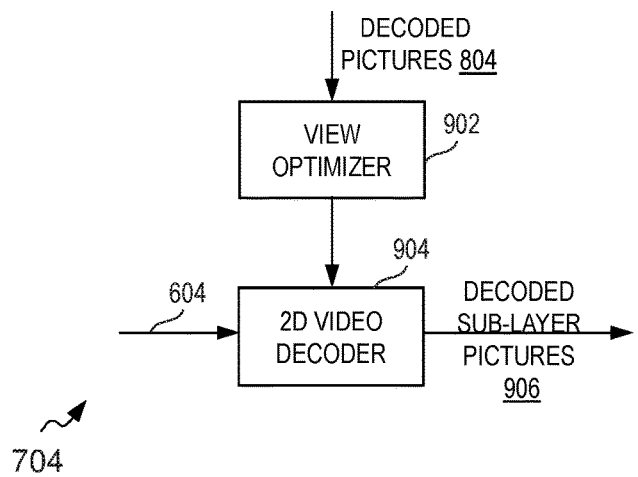
FIG. 9 illustrates a sub-layer decoder, in accordance with an example embodiment of the present disclosure.

FIG. 9 illustrates a sub-layer decoder 704 (or 706), in accordance with an example embodiment of the present disclosure.

Each sub-layer decoder includes a view optimizer 902 that receives the decoded picture 804 to generate view optimized reference pictures for desired view. The sub-layer decoder also includes a 2D video decoder 904 for decoding the second layer 604 (or 204) to generate decoded sub-layer bitstream 906. The 2D video decoder 904 decodes frames other than the encoded frames present in the first layer 202 or 602 which are rather view optimized.

In various embodiments, although multiple 2D video decoders are shown, the processing of various layers can be done using one 2d video decoder or several instances of same or different 2D video decoders.

Figure 10:
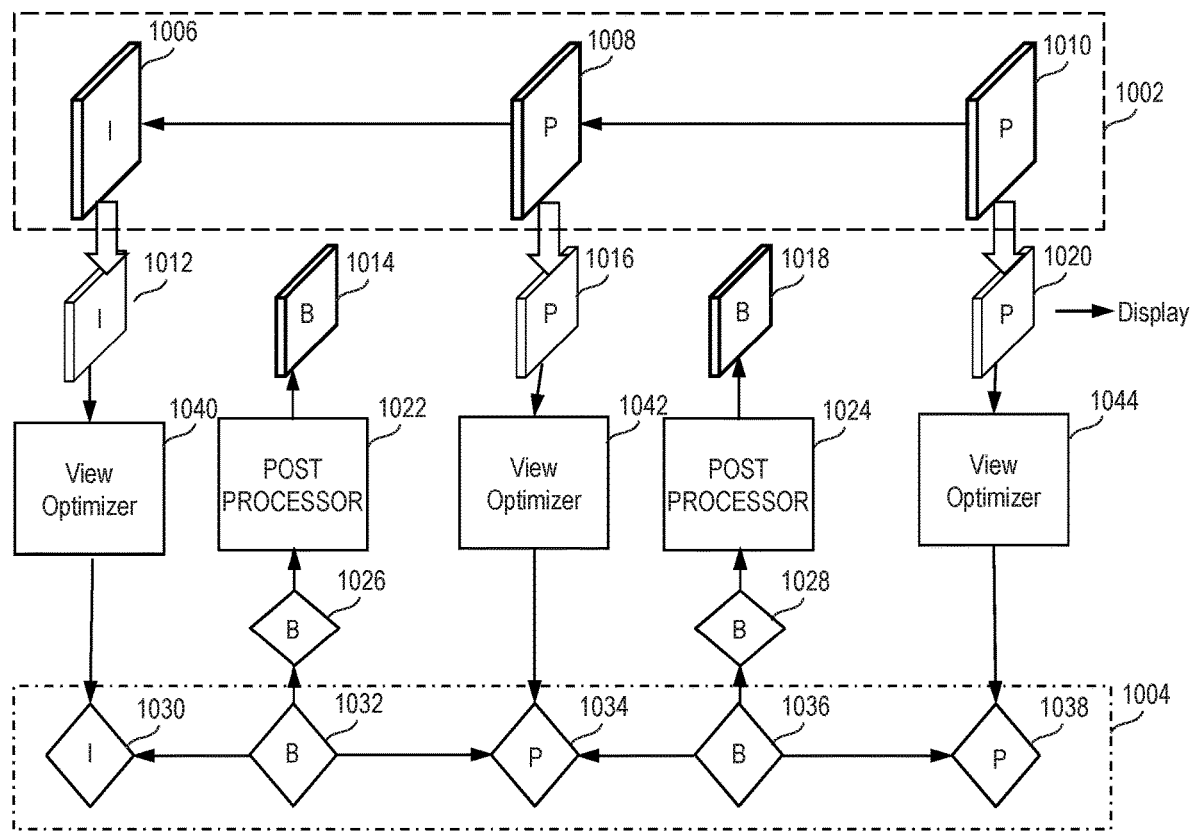
FIG. 10 illustrates a process flow for two layers one view decoding of the encoded video, in accordance with an example embodiment of the present disclosure.

FIG. 10 illustrates a process flow for two layers one view decoding of the encoded video 110, in accordance with an example embodiment of the present disclosure.

The first layer 1002 (first layer video stream 1002) of the encoded video 110 is received and decoded using the 2D video decoder 802 to generate decoded frames or pictures 1012, 1016 and 1020 from the encoded frames 1006, 1008, and 1010 of the first layer 1002.

The first sub-layer 1004 which corresponds to one selected view is also decoded using the video decoder 904 to generate decoded frames 1026 and 1028 from encoded frames 1032 and 1036, respectively. The reconstructed frames 1012, 1016, and 1020 from the first layer are view optimized using view optimizers 1040, 1042 and 1044, which are defined using the view optimizer 902 to generate reference images 1030, 1034 and 1038 for the first sub-layer decoding. The decoded images 1026 and 1028 are then fed into post processors 1022 and 1024, as defined using the post processor 708 to generate regular 360-degree video frames 1014 and 1018 for display.

Figure 11:
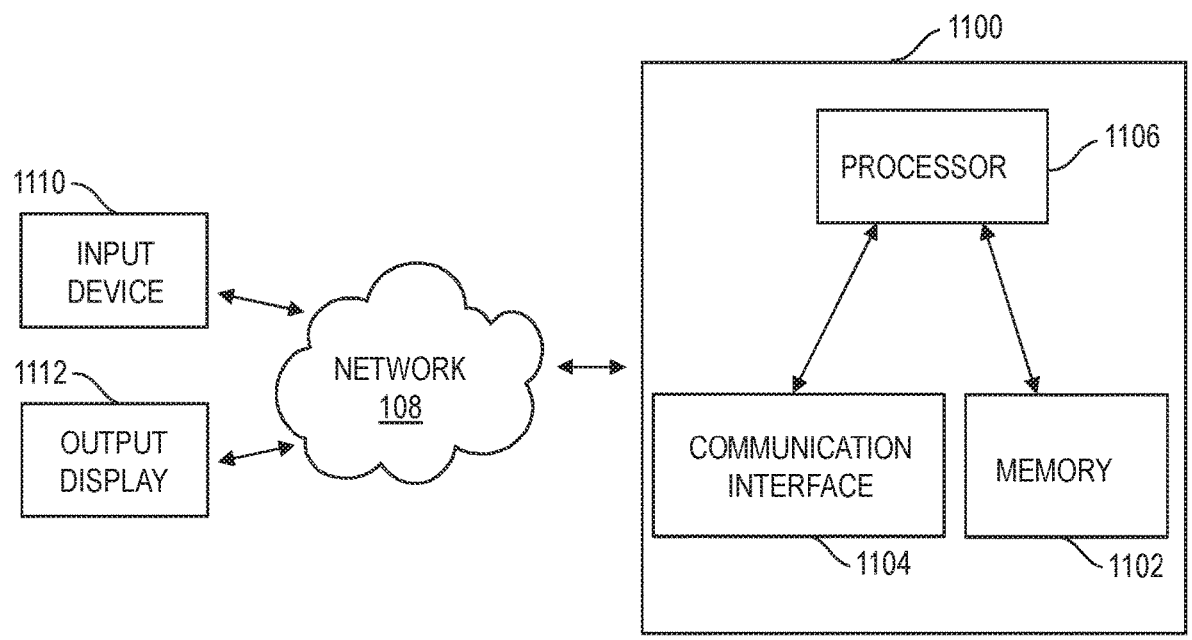
FIG. 11 illustrates a server, in accordance with an example embodiment of the present disclosure.

FIG. 11 illustrates a block diagram 1100 that represents a server 104, in accordance with an example embodiment of the present disclosure. In an embodiment, the server 104 includes a memory 1102, a communication interface 1104 and at least one processor 1106 for performing image processing including receiving, encoding/decoding, image-video-audio processing, and streaming of input video.

The memory 1102 is a storage device embodied as one or more volatile memory devices, one or more non-volatile memory devices, and/or a combination of one or more volatile memory devices and non-volatile memory devices, for storing micro-contents information and instructions. The memory 1102 may be embodied as magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc), BD (Blu-ray® Disc), and semiconductor memories (such as mask ROM, PROM (programmable ROM), EPROM (erasable PROM), flash ROM, RAM (random access memory), etc.).

The communication interface 1104 may enable the server 104 to communicate with one or more client devices (e.g., client device 112 as shown in FIG. 1) through a network 108.

In an embodiment, the server 104 is also shown to take an input from an input device 1110, which is directly coupled to the server 104 or via the network 108 for receiving input videos (e.g., input video 102 as shown in FIG. 1). The server 104 is further coupled with an output display 1112, such as but not limited to a cathode ray tube (CRT), a LCD screen, a mobile device screen and a laptop screen for displaying information to the user. The communication interface 1104 is capable of communicating with the network 108, example of which may include but are not limited to, wired, wireless cell phone networks, Wi-Fi networks, terrestrial microwave network, or any form of Internet. While only one input device 1110 and one output display 1112 is depicted in FIG. 11 for illustrative purposes, and it would be apparent that any number of input devices and output devices can be coupled with the server 104 through the network 108.

The processor 1106 is communicably coupled with the memory 1102 and the communication interface 1104. The processor 1106 is capable of executing the stored machine executable instructions in the memory 1102 or within the processor 1106 or any storage location accessible to the processor 1106. The processor 1106 may be embodied in a number of different ways. In an embodiment, the processor 1106 may be embodied as one or more of various processing devices, such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. The processor 1106 performs various functionalities of the server 104 as described herein.

Figure 12:
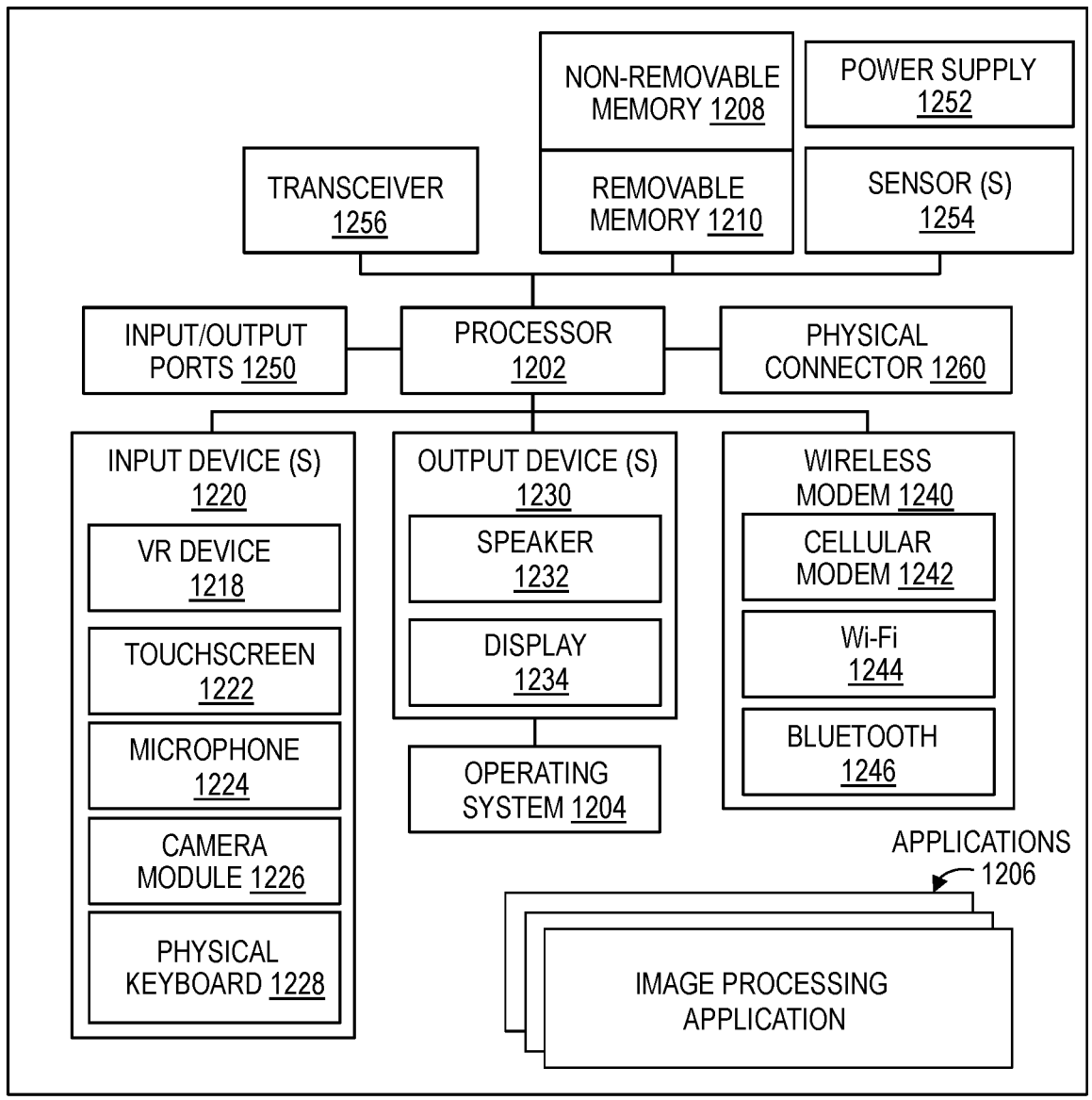
FIG. 12 illustrates a client device, in accordance with an example embodiment of the present disclosure.

FIG. 12 illustrates a client device 112, in accordance with an example embodiment of the present disclosure.

It should be understood that the client device 112 as illustrated and hereinafter described is merely illustrative of one type of device and should not be taken to limit the scope of the embodiments. As such, it should be appreciated that at least some of the components described below in connection with the client device 112 may be optional and thus in an example embodiment may include more, less or different components than those described in connection with the example embodiment of the FIG. 12. As such, among other examples, the client device 112 could be any of the mobile electronic devices, for example, personal digital assistants (PDAs), mobile televisions, gaming devices, cellular phones, tablet computers, laptops, mobile computers, cameras, mobile digital assistants, or any combination of the aforementioned, and other types of communication or multimedia devices.

The illustrated client device 112 includes a controller or a processor 1202 (e.g., a signal processor, microprocessor, ASIC, or other control and processing logic circuitry) for performing tasks such as signal coding, data processing, image processing, input/output processing, power control, and/or other functions. An operating system 1204 controls the allocation and usage of the components of the client device 112 and support for one or more applications programs (see applications 1206), such as a VR application, that implements one or more of the innovative features described herein.

The illustrated client device 112 includes one or more memory components, for example, a non-removable memory 1208 and/or removable memory 1210. The non-removable memory 1208 can include RAM, ROM, flash memory, a hard disk, or other well-known memory storage technologies. The removable memory 1210 can include flash memory, smart cards, or a Subscriber Identity Module (SIM). The one or more memory components can be used for storing data and/or code for running the operating system 1204 and the applications 1206. Example of data can include web pages, text, images, sound files, image data, video data, or other data sets to be sent to and/or received from one or more network servers or other devices via one or more wired or wireless networks.

The client device 112 can support one or more input devices 1220 and one or more output devices 1230. Examples of the input devices 1220 may include, but are not limited to, a VR device 1218 for providing head movement, a touchscreen 1222 (e.g., capable of capturing finger tap inputs, finger gesture inputs, multi-finger tap inputs, multi-finger gesture inputs, or keystroke inputs from a virtual keyboard or keypad), a microphone 1224 (e.g., capable of capturing voice input), a camera module 1226 (e.g., capable of capturing still picture images and/or video images) and a physical keyboard 1228. Examples of the output devices 1230 may include, but are not limited to a speaker 1232 and a display 1234. Other possible output devices (not shown in the FIG. 12) can include piezoelectric or other haptic output devices. Some devices can serve more than one input/output function. For example, the touchscreen 1222 and the display 1234 can be combined into a single input/output device.

A wireless modem 1240 can be coupled to one or more antennas (not shown in the FIG. 12) and can support two-way communications between the processor 1202 and external devices, as is well understood in the art. The wireless modem 1240 is shown generically and can include, for example, a cellular modem 1242 for communicating at long range with the mobile communication network, a Wi-Fi compatible modem 1244 for communicating at short range with an external Bluetooth-equipped device or a local wireless data network or router, and/or a Bluetooth-compatible modem 1246. The wireless modem 1240 is typically configured for communication with one or more cellular networks, such as a GSM network for data and voice communications within a single cellular network, between cellular networks, or between the client device 112 and a public switched telephone network (PSTN).

The client device 112 can further include one or more input/output ports 1250, a power supply 1252, one or more sensors 1254 for example, an accelerometer, a gyroscope, a compass, or an infrared proximity sensor for detecting the orientation or motion of the client device 112, a transceiver 1256 (for wirelessly transmitting analog or digital signals) and/or a physical connector 1260, which can be a USB port, IEEE 1394 (FireWire) port, and/or RS-232 port. The illustrated components are not required or all-inclusive, as any of the components shown can be deleted and other components can be added.

Figure 13:
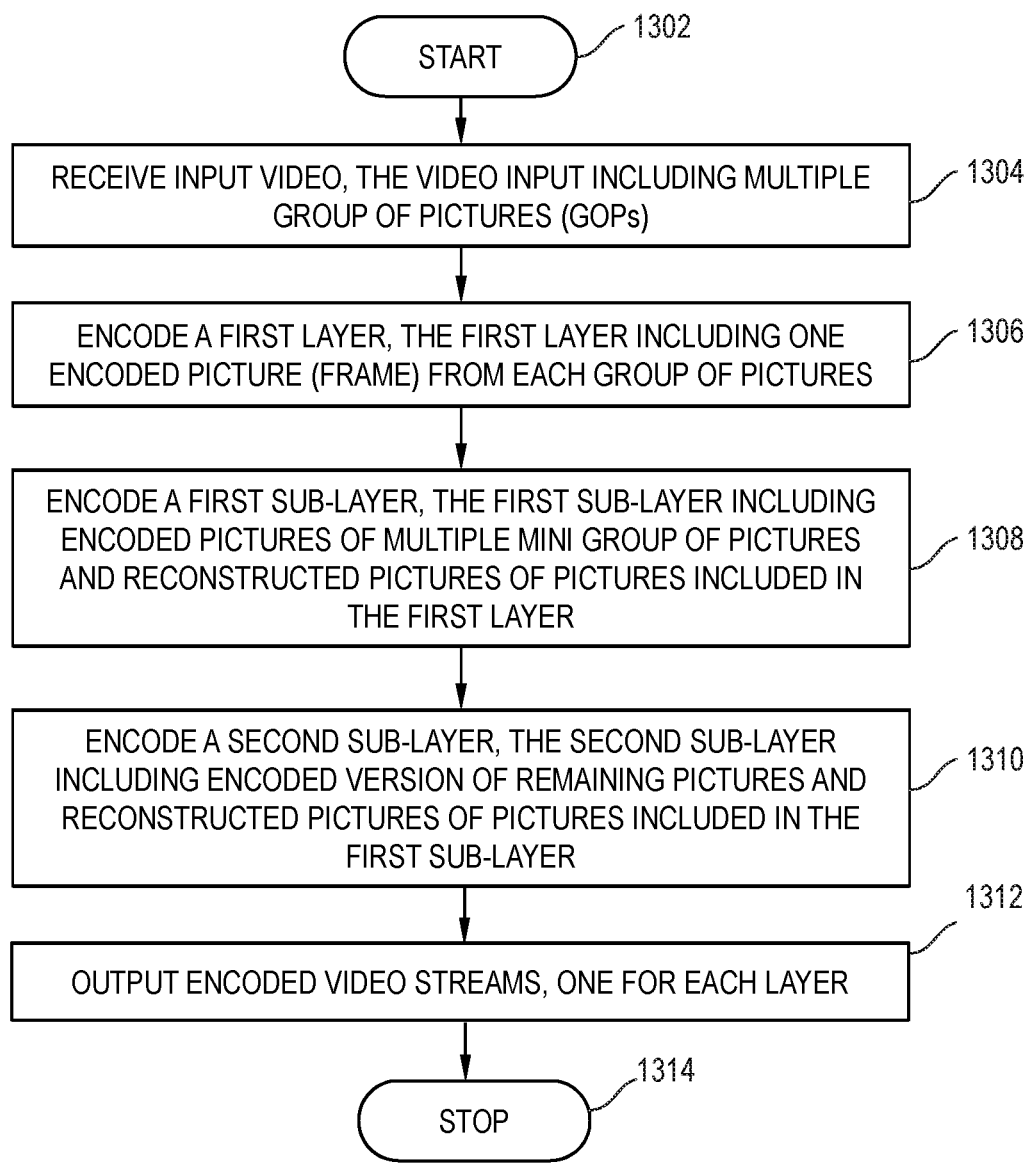
FIG. 13 illustrates a method for encoding the input video, in accordance with an example embodiment of the present disclosure.

FIG. 13 illustrates a method for encoding the input video, for example the input video 102, in accordance with an example embodiment of the present disclosure.

The method starts at step 1302.

At step 1304, the input video 102 is received. The input video 102 includes multiple GOPs. Each GOP runs from one major anchor frame, i.e. I-frame or P-frame, to another major anchor frame and includes all frames in between.

At step 1306, a first layer (first layer video stream) is generated from the video 102. The number of encoded frames or pictures in the first layer is equal to the number of GOPs. The first layer includes one picture per GOP. The first layer is generated by temporal sub-sampling of the input video 102 followed by the encoding of these sub-sampled frames or pictures. The temporal sub-sampling results in generation of sub-sampled major anchor frames. The first layer generation includes temporal sub-sampling of the input video to generate sub-sampled major anchor frames, the sub-sampled major anchor frames including one major anchor frame from each GOP. The first layer is encoded with no view optimization. Also, the first layer is encoded with no reference to any of the sub-layer video frames. The first layer includes full spherical view and is encoded in view independent manner. The encoded first layer video stream is part of encoded video stream 110. Reconstructed (referenced) frames are also generated for the frames of the first layer. The reconstructed frames are generated by decoding the encoded first layer video frames at the encoder side. The generation of the first layer includes generating reconstructed frames from the encoded first layer, and providing the reconstructed frames to a first sub-layer as reference. The reconstructed video frames are used as reference frames for encoding sub-layers.

At step 1308, the first sub-layer (multiple video streams for multiple views) is generated by sub-sampling frames based on need of the first sub-layer and then encoding those frames which are present in the sub-sampled frames but not in the first layer. Such frames are usually sampled at one per mini GOP of all the mini GOPs. For the frames that are present both in the sub-sample and in the first layer, the encoding is not performed at the first sub-layer but reconstructed frames from the first layer are used for referencing.

The encoded first sub-layer video stream (streams) is part of encoded video stream 110. Reconstructed (referenced) frames are also generated for the frames of the first sub-layer. The reconstructed frames (pictures) are generated by decoding the encoded first sub-layer video frames at the encoder side. The reconstructed video frames are used as reference frames for encoding the second sub-layers.

The first sub-layer generation includes generating multiple first sub-layer encoded video streams, one for each selected view. The sub-layer video streams are encoded with reference to the first layer. The sub-layer video is also encoded with view optimization to achieve better compression efficiency.

In some embodiments, the generation of the first sub-layer includes temporal sub-sampling of the input video to obtain the sub-major anchor frames of each mini-GOP within a GOP except for the major anchor frame, replacing the missing major anchor frame in the first sub-layer with the reconstructed frames from the first layer, performing view optimization on the first sub-layer for a selected view, and performing 2D encoding of the first sub-layer except for the major anchor frame which has been encoded already in the first layer. The generation of the first sub-layer also includes generating reconstructed frames from the first sub-layer, and providing the reconstructed frames from the first sub-layer to a second sub-layer as reference, if needed.

In some embodiments, if needed, generating multiple second sub-layer encoded video streams, one for each selected view is also performed.

At step 1310, a second sub-layer (multiple second sub-layer video streams) is generated by sub-sampling frames based on need of the second sub-layer and then encoding those remaining frames which are present in the sub-sampled frames but neither in the first layer nor in the first sub-layer. For the frames that are present in the sub-sample and also either in the first layer or in the first sub-layer, the encoding is not performed at the second sub-layer but reconstructed frames from either the first layer or the first sub-layer are used for referencing. The second sub-layer includes encoding all remaining frames i.e. frames not present in either the first layer or the first sub-layer. The encoded second sub-layer video stream is as part of encoded video stream 110.

In some embodiments, based on the need, it is possible that the second sub-layer is not required and mere the first sub-layer suffices.

The second sub-layer includes remaining frames that are not encoded in the first layer and the first sub-layer, and the generation of the second sub-layer includes replacing the missing major anchor frames and the sub-major anchor frames in the second sub-layer with the reconstructed video frames from the first layer and the first sub-layer, performing view optimization on the second sub-layer for a selected view, and performing 2D encoding of the second sub-layer except for the major anchor frames and the sub-major anchor frames which have been encoded already in the first layer and the first sub-layer.

At step 1312, the encoded video, for example the encoded video 110, is outputted. The encoded video includes the first layer and at least one sub-layer. In one embodiment, the encoded video includes the first layer, the first sub-layer and the second sub-layer. The outputting includes outputting multiple encoded video streams, one for the first layer and multiple for the first sub-layer and the second sub-layer for all selected views. The outputting includes storing the encoded video for streaming to the client device as and when desired.

The method stops at step 1314.

Figure 14:
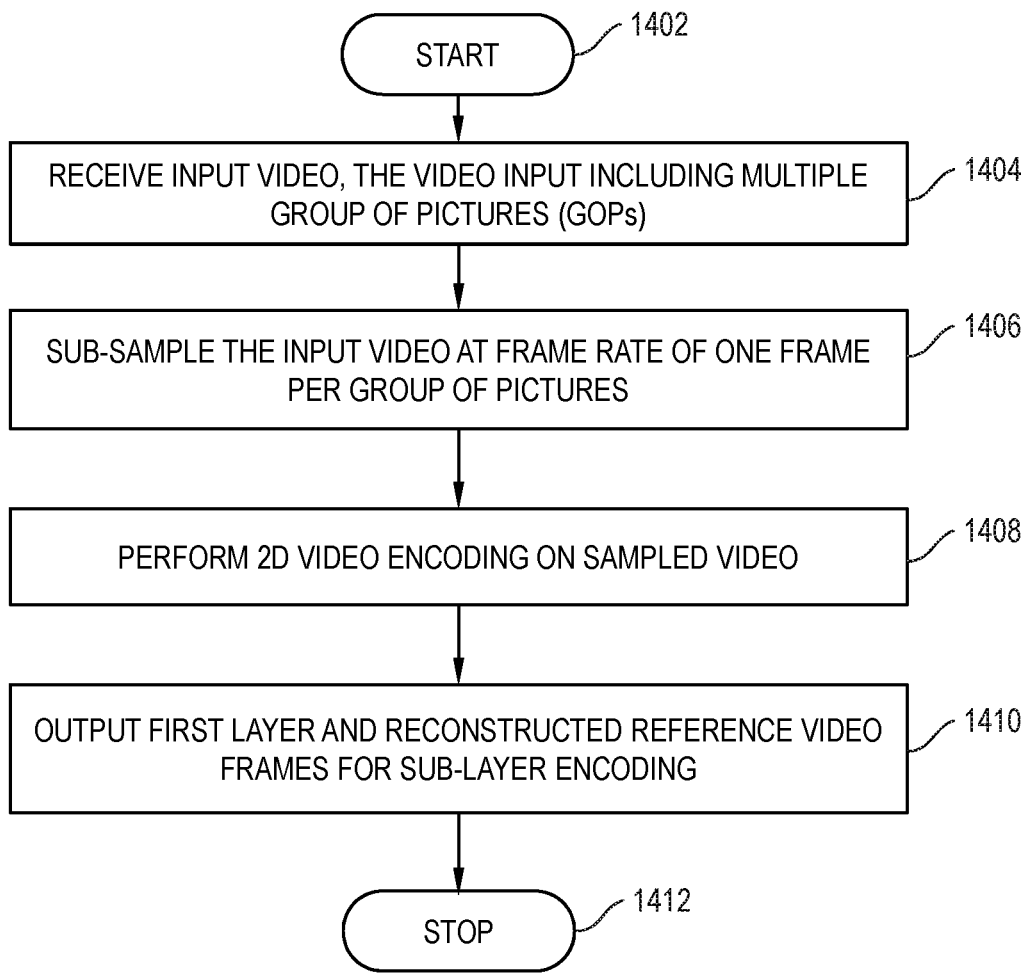
FIG. 14 illustrates a method for generating a first layer from the input video, in accordance with an example embodiment of the present disclosure.

FIG. 14 illustrates a method for generating a first layer from the input video, for example the video 102, in accordance with an example embodiment of the present disclosure.

The method starts at step 1402.

At step 1404, the video 102 is received.

At step 1406, the video 102 is sub-sampled to generate video at frame rate of one frame per GOP.

At step 1408, 2D video encoding is performed on the sampled video to generate the first layer.

At step 1410, the first layer and the reconstructed video frames are outputted for sub-layer encoding.

The method stops at step 1412.

Figure 15:
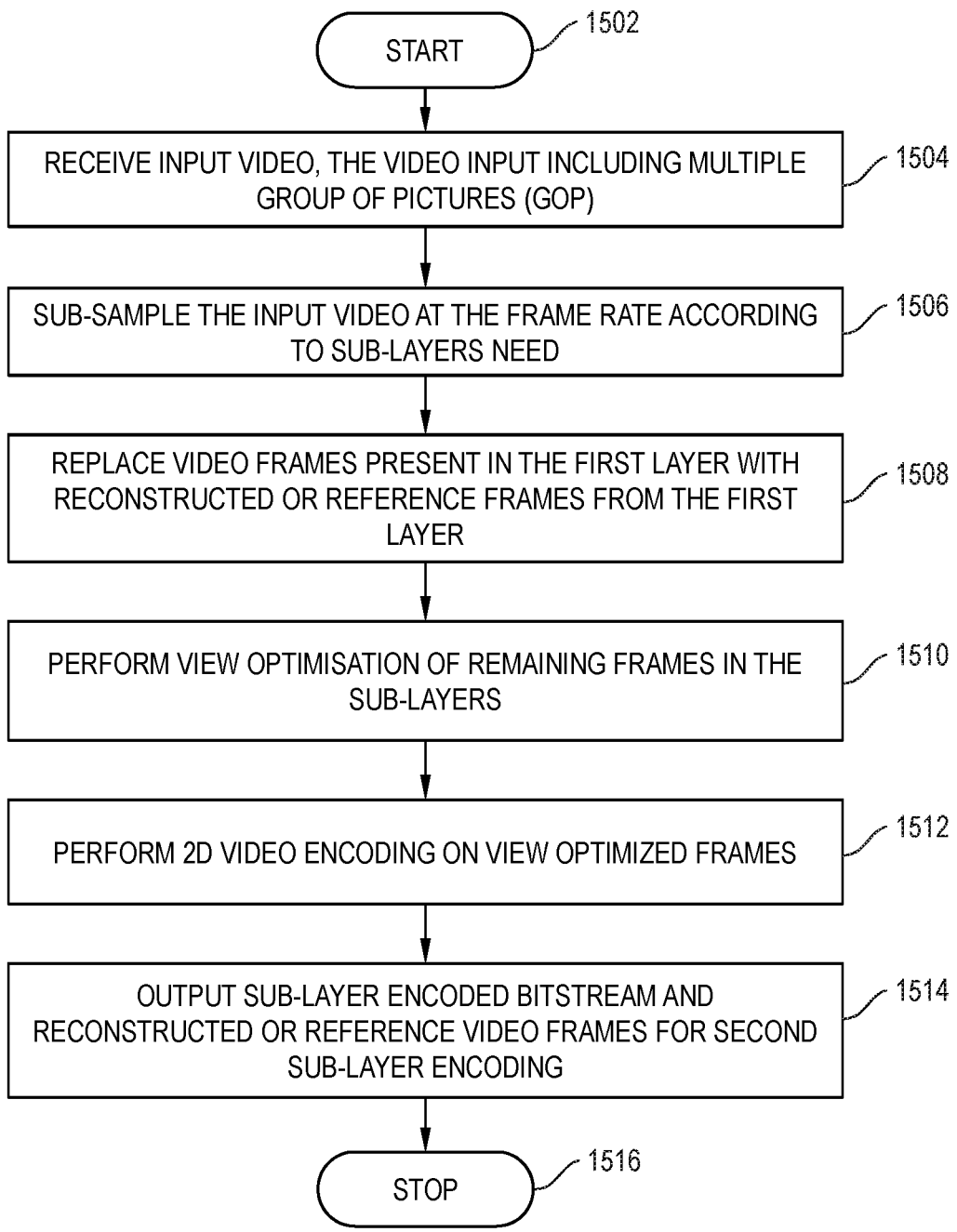
FIG. 15 illustrates a method for generating a sub-layer from the input video, in accordance with an example embodiment of the present disclosure.

FIG. 15 illustrates a method for generating a sub-layer from the input video, for example the video 102, in accordance with an example embodiment of the present disclosure.

The method starts at step 1502.

The video 102 is received at step 1504, by a sub-layer encoder.

At step 1506, the video 102 is sub-sampled at a frame rate according to the sub-layer need.

At step 1508, the frames in the sub-sampled frames for which reconstructed frames are present in the first layer are replaced with the reconstructed frames.

At step 1510, view optimization is performed for all frames.

At step 1512, the view optimized frames are 2D encoded to generate output of the sub-layer.

At step 1514, the encoded bitstream and reconstructed reference frames are outputted for further sub-layer encoding or completing the encoding.

It is to be appreciated that the view optimization can be performed further, if needed.

The method stops at step 1516.

The algorithm for performing method described in FIG. 13 or FIG. 14 or FIG. 15 is provided below.

Figure 16:
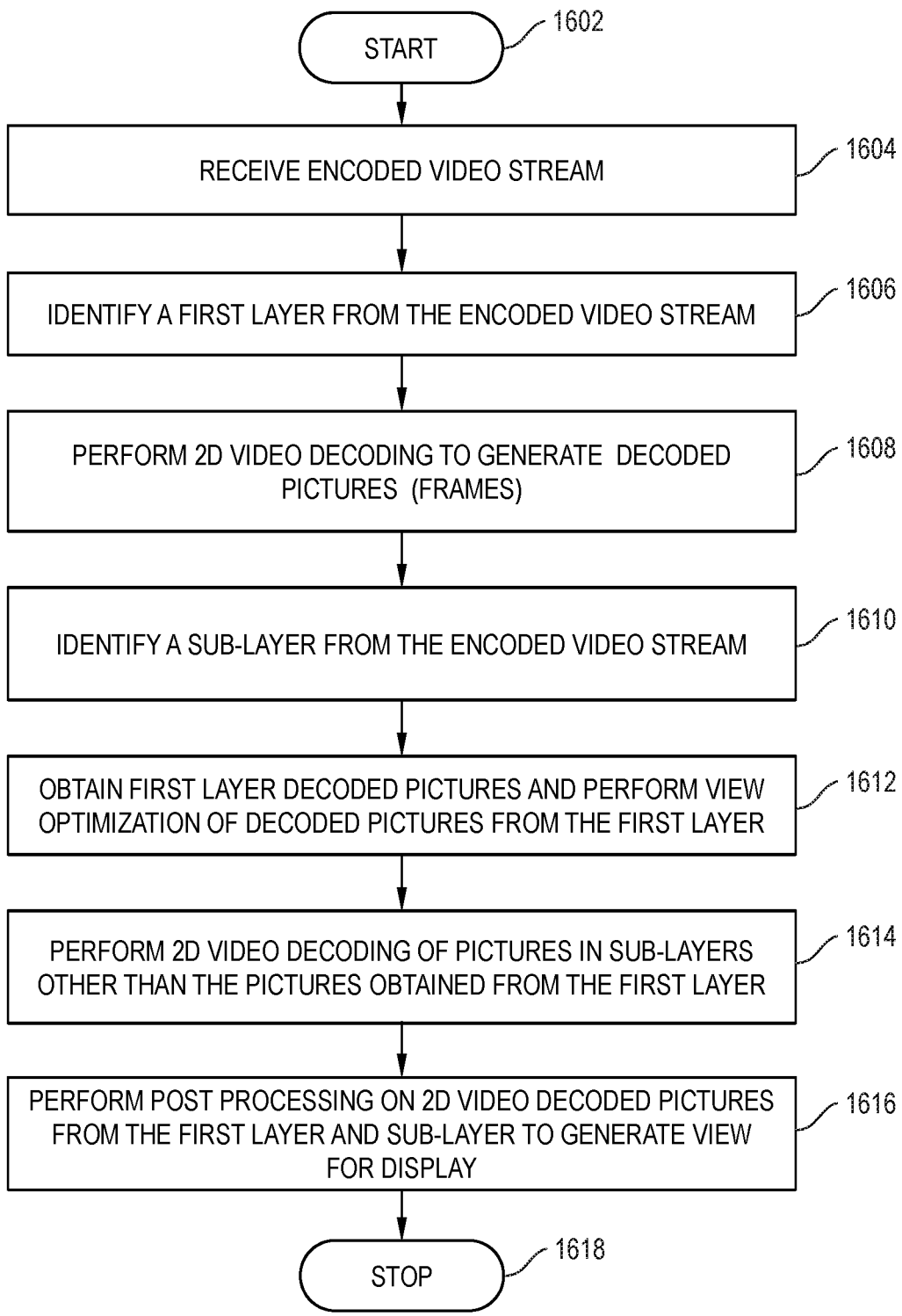
FIG. 16 illustrates a method for decoding the encoded video, in accordance with an example embodiment of the present disclosure.

Top Layer Encoding
    Takes input video frames in 2D equirectangular format
    Sub-sample the input video at frame-rate of one frame per GOP
    No view optimization processing is done to the input video frames
    Do regular 2D video encoding on the low frame rate video input
        Allow all coding picture types (I, P and B) to be used
        No view optimization processing is done to the encoded video frame
    Output top layer encoded bitstream
    Output reconstructed video frames
        To be used as reference for sub-layers encoding Sub-Layer Encoding
    Takes input video frames in 2D equirectangular format
    Sub-sample the input video at the frame-rate according to sub-layer's need
    Replace the video frames that belong to top layer with the reconstructed video frame from the top layer encoding
    Do view optimization processing to the input video frames
    Do 2D video encoding on the view optimized video input as follows:
        Apply the GOP structure and picture types in regular way
        Skip the encoding of the video frames from top layer Use the view optimized reconstructed video frame as the reference frame for following pictures
Do regular 2D encoding for the rest of the pictures
Do more view optimization processing to the encoded video frame, if needed
Output sub-layer encoded bitstream
Skip the output of bitstreams for pictures that have been encoded in top layer
Output reconstructed video frames, if needed
To be used as reference for sub-layers encoding FIG. 16 illustrates a method for decoding the encoded video, for example the encoded video 110, in accordance with an example embodiment of the present disclosure.

The method starts at step 1602.

At step 1604, the encoded video stream (including multiple video streams, one for each layer), for example the encoded video 110, is received.

At step 1606, a first layer (also referred to as the first layer stream) is identified or received from the encoded video stream.

At step 1608, the first layer is decoded by performing 2D video decoding on the first layer to generate decoded pictures of the first layer. The first layer can be decoded directly and independently. The decoded frames are regular video frames that have no view optimization and can be displayed directly.

The first layer decoding also includes performing view optimization of the decoded frames of the first layer for the view used in companion sub-layers (the first sub-layer) and providing the view optimized decoded frames of the first layer to the first sub-layer as reference.

At step 1610, a sub-layer (also referred to as sub-layer stream or first sub-layer stream) from the encoded video stream is accessed or identified or received from the encoded video stream. The first sub-layer includes encoded frames of sub-major anchor frames of the mini-GOPs within a GOP except for the major anchor frame which is encoded in the first layer.

At step 1612, the decoded pictures from the first layer are obtained and view optimization is performed to generate the pictures that are used as reference pictures for the sub layer. In some embodiments, step 1612 is part of step 1614.

At step 1614, 2D video decoding of the remaining frames or pictures, i.e. frames not processed at step 1612, is performed to generate decoded pictures from the sub-layer. In one embodiment, there may be two sub-layers, i.e. first sub-layer and second sub-layer. In such embodiment, the decoding is performed for the first sub-layer first to generate the decoded frames of the first sub-layer followed by the decoding of the second sub-layer to generate decoded frames of the second sub-layer.

In some embodiments, when the major anchor frame is needed for reference then use the one obtained from the decoded frames of the first layer.

At step 1616, the decoded pictures from the first layer and from the sub-layer are post processed to generate view to display. In some embodiments, performing post processing includes post processing decoded frames of the first sub-layer to generate regular video frame from the view optimized video frame for the display, and if a second sub-layer exists then performing view optimization on decoded first sub-layer (frames) with the view used in the companion second sub-layers (second sub-layer). Further, provide the view optimized decoded frames of the first sub-layer to the second sub-layer as reference.

In some embodiments, reconstruction is a part of the decoding process. The bitstream is decoded and from the bitstream a video frame is reproduced. This reproducing process is also called reconstruction. The reproduced video frame is either called reconstructed frame or more often decoded frame. The decoding process is embedded inside the encoding process in context of video. During the encoding process in FIG. 13, 14 or 15, the decoding process is used to reproduce a video frame from the compressed information in the same way as the decoder does. The reproduced video frame is specifically called reconstructed frame. In this ways, encoder and decoder have access to the same exact reconstructed video frame and use it as the reference picture. This helps keeping encoder and decoder in sync.

The method stops at step 1618.

The method for decoding a layer based view optimization encoded 360-degree video stream includes receiving, by a client device, multiple encoded video streams. There is one encoded video stream from the first layer. There is another stream from the sub-layer of a selected view. The method includes decoding the first layer video stream to generate decoded first layer video frames. The decoded first layer video frames include one major anchor frame or key frame per GOP. The first layer decoding can be performed independent from any sub-layer video streams. The method also includes decoding one sub-layer video stream to generate decoded sub-layer video frames. The decoded sub-layer video frames include all video frames other than the key frame in a GOP. The sub-layer decoding cannot perform independently. The method includes performing a proper referencing to the decoded first layer video frames during the decoding of the sub-layer video streams. Furthermore, the method includes performing a proper post-processing on the decoded first layer video frames to generate the proper reference frame to be used in decoding the sub-layer video streams.

The algorithm for performing method described in FIG. 16 is provided below.
Top Layer Decoding
Take the first layer bitstream as input
Do regular 2D decoding to produce the decoded pictures
Sub-Layer Decoding
Take one view dependent bitstream as input
Take the top layer decoded pictures, do view optimization process to generate the view optimized reference pictures for current view
Do 2D video decoding as follows:
Skip the decoding of pictures that belong to top layer
Do regular 2D video decoding for pictures of current layer
Whenever there is a need to use the pictures that belong to the top layer as the reference pictures, use the ones generated from decoded pictures from the top layer and are view optimized In general, the method executed to implement the embodiments of the present disclosure, may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects of the invention. Moreover, while the present disclosure has been described in the context of fully functioning computers and computer systems, those skilled in the art will appreciate that the various embodiments of the invention are capable of being distributed as a program product in a variety of forms, and that the present disclosure applies equally regardless of the particular type of machine or computer readable media used to actually effect the distribution. Examples of computer-readable media include but are not limited to recordable type media such as volatile and non-volatile memory devices, USB and other removable media, hard disk drives, optical disks (e.g., Compact Disk Read-Only Memory (CD ROMS), Digital Versatile Disks, (DVDs), etc.), flash drives among others.

The present disclosure is described above with reference to block diagrams and flowchart illustrations of method and device embodying the present disclosure. It will be understood that various block of the block diagram and flowchart illustrations, and combinations of blocks in the block diagrams and flowchart illustrations, respectively, may be implemented by a set of computer program instructions. These set of instructions may be loaded onto a general purpose computer, special purpose computer, or other programmable data processing apparatus to cause a device, such that the set of instructions when executed on the computer or other programmable data processing apparatus create a means for implementing the functions specified in the flowchart block or blocks. Although other means for implementing the functions including various combinations of hardware, firmware and software as described herein may also be employed.

Various embodiments described above may be implemented in software, hardware, application logic or a combination of software, hardware and application logic. The software, application logic and/or hardware may reside on at least one memory, at least one processor, an apparatus or, a non-transitory computer program product. In an example embodiment, the application logic, software or an instruction set is maintained on any one of various conventional computer-readable media. In the context of this document, a "computer-readable medium" may be any non-transitory media or means that can contain, store, communicate, propagate or transport the instructions for use by or in connection with an instruction execution system, apparatus, or device. A computer-readable medium may comprise a computer-readable storage medium that may be any media or means that can contain or store the instructions for use by or in connection with an instruction execution system, apparatus, or device, such as a computer.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present disclosure.

What is claimed is:

1. A method for doing layer based view optimization encoding to an input video, the method comprising:
   receiving, by a server, the input video, the input video comprising multiple groups of pictures (GOPs), each GOP starting from a major anchor frame of the input video and comprising frames till next major anchor frame;
   generating a first layer, the first layer comprising one encoded frame per GOP;
   generating a first sub-layer, the first sub-layer comprising encoded frames of multiple mini-GOPs and reconstructed frames of encoded frames of the first layer, each mini-GOP comprising frames between two major anchor frames, wherein generating the first sub-layer comprises:
      temporal sub-sampling of the input video to obtain sub-major anchor frames of each mini-GOP within a GOP except for the major anchor frame,
      replacing missing major anchor frames in the first sub-layer with the reconstructed frames from the first layer, and
      performing view optimization on the first sub-layer for a selected view; and outputting encoded video comprising the first layer and the first sub-layer.

2. The method as claimed in claim 1, wherein the input video is 360-degree video.

3. The method as claimed in claim 1, wherein generating the first layer comprises:
   temporal sub-sampling of the input video to generate sub-sampled major anchor frames, the sub-sampled major anchor frames comprising one major anchor frame from each GOP; and
   performing 2D encoding of the sub-sampled major anchor frames.

4. The method as claimed in claim 1, wherein generating the first layer comprises:
   generating the reconstructed frames from the first layer; and
   providing the reconstructed frames to the first sub-layer as reference.

5. The method as claimed in claim 1, wherein generating the first sub-layer further comprises:
   performing 2D encoding of the first sub-layer except for the major anchor frames which have been encoded already in the first layer.

6. The method as claimed in claim 5 and further comprising
   generating reconstructed frames from the first sub-layer; and
   providing the reconstructed frames from the first sub-layer to a second sub-layer as reference.

7. The method as claimed in claim 6 and further comprising:
   generating the second sub-layer, the second sub-layer comprising remaining frames that are not encoded in the first layer and the first sub-layer.

8. The method as claimed in claim 7 and further comprising:
   replacing the missing major anchor frames and the sub-major anchor frames in the second sub-layer with the reconstructed video frames from the first layer and the first sub-layer;
   performing view optimization on the second sub-layer for a selected view; and
   performing 2D encoding of the second sub-layer except for the major anchor frames and the sub-major anchor frames which have been encoded already in the first layer and the first sub-layer.

9. A system for encoding an input video, the system comprising:
 a first layer encoder for
  receiving the input video, the input video comprising multiple groups of pictures (GOPs), each GOP starting from a major anchor frame of the input video and comprising frames till next major anchor frame, and generating a first layer, the first layer comprising one encoded frame per GOP; and
 a first sub-layer encoder for
  generating a first sub-layer, the first sub-layer comprising encoded frames of multiple mini-GOPs and reconstructed frames of encoded frames of the first layer, each mini-GOP comprising frames between two major anchor frames, wherein the first sub-layer encoder comprises:
   a sub-sampler that obtains sub-major anchor frames of each mini-GOP within a GOP except for the major anchor frame,
   a replacer that replaces missing major anchor frames in the first sub-layer with the reconstructed frames from the first layer, and
   a view optimizer that performs view optimization on the first sub-layer for a selected view, and
  outputting encoded video comprising the first layer and the first sub-layer.

10. The system as claimed in claim 9, wherein the input video is 360-degree video.

11. The system as claimed in claim 9, wherein the first layer encoder comprises:
 a sub-sampler for sub-sampling major anchor frames to generate sub-sampled major anchor frames, the sub-sampled major anchor frames comprising one major anchor frame from each GOP; and
 a 2D video encoder for performing 2D encoding of the sub-sampled major anchor frames.

12. The system as claimed in claim 9, wherein the first layer encoder comprises:
 a producer that generates the reconstructed frames from the first layer, and
 a provider that provides the reconstructed frames to sub-layers as reference.

13. The system as claimed in claim 9, wherein the first sub-layer encoder further comprises:
 a 2D encoder that encodes the first sub-layer except for the major anchor frames which have been encoded already in the first layer.

14. The system as claimed in claim 13, wherein the first sub-layer encoder further comprises:
 a producer that generates reconstructed frames from the first sub-layer, and
 a provider that provides the reconstructed frames from the first sub-layer to second sub-layer as reference.

15. The system as claimed in claim 9 and further comprising:
 a second sub-layer encoder for generating a second sub-layer, the second sub-layer comprising remaining frames that are not encoded in the first layer and the first sub-layer.

16. A method for decoding an encoded video stream, the method comprising:
 receiving, by a client device, the encoded video stream, the encoded video stream comprising multiple groups of pictures (GOPs), each GOP starting from a major anchor frame of the encoded video stream and comprising frames till next major anchor frame;
 identifying a first layer from the encoded video stream, the first layer comprising one encoded frame per GOP;
 performing 2D video decoding on the first layer to generate decoded frames of the first layer;
 identifying a first sub-layer from the encoded video stream, the first sub-layer comprising encoded frames of sub-major anchor frames of the mini-GOPs within a GOP except for major anchor frames which are encoded in the first layer;
 performing 2D video decoding on the first sub-layer to generate decoded frames of the first sub-layer;
 performing 2D video decoding on a second sub-layer to generate decoded frames of the second sub-layer in a similar way as that of the first sub-layer; and
 performing post processing on decoded frames of the first layer, the first sub-layer, and the second sub-layer to generate view for display.

17. The method as claimed in claim 16, wherein the encoded video stream is of 360-degree video.

18. A system for decoding an encoded video stream, the system comprising:
 a first layer decoder for
  receiving the encoded video stream, the encoded video stream comprising multiple groups of pictures (GOPs), each GOP starting from a major anchor frame of the encoded video stream and comprising frames till next major anchor frame,
  identifying a first layer, the first layer comprising one encoded frame per GOP, and
  decoding frames of the first layer to generate decoded frames of the first layer;
 a first sub-layer decoder for,
  identifying a first sub-layer, the first sub-layer comprising encoded frames of multiple mini-GOPs and reconstructed frames of encoded frames of the first layer, each mini-GOP comprising frames between two major anchor frames, and
  decoding frames of the first sub-layer to generate decoded frames of the first sub-layer;
 a second sub-layer decoder that has similar components as in the first sub-layer decoder, wherein a second sub-layer comprises remaining frames that are not encoded in the first layer and the first sub-layer; and
 a post processor for post processing frames of the first layer, the first sub-layer, and the second sub-layer to generate view for display.

19. The system as claimed in claim 18, wherein the encoded video stream is a 360-degree video.

* * * * *